United States Patent [19]

Nissen et al.

[11] 4,186,619

[45] Feb. 5, 1980

[54] WINDING DEVICE

[75] Inventors: Alex Nissen, Paris; Distel Charles, Chatillon, both of France

[73] Assignee: Videon, S.A., Boulogne-Billancourt, France

[21] Appl. No.: 905,627

[22] Filed: Jun. 1, 1978

[30] Foreign Application Priority Data

May 13, 1977 [FR] France .................................. 77 14656

[51] Int. Cl.² ......................................... H02K 15/04
[52] U.S. Cl. .................................. 74/414; 242/7.05 R
[58] Field of Search .................... 74/414; 29/597, 598; 242/7.05 R, 7.16

[56] References Cited

U.S. PATENT DOCUMENTS

| 2,779,886 | 1/1957 | Hunsdorf | 242/7.05 R X |
| 2,971,706 | 2/1961 | Ellis et al. | 242/7.16 |
| 3,169,301 | 2/1965 | Fletcher et al. | 242/7.05 C X |
| 3,474,515 | 10/1969 | Dammar | 242/7.05 R X |
| 3,713,209 | 1/1973 | Biddison | 29/598 X |
| 3,857,172 | 12/1974 | George | 242/7.05 R X |
| 3,913,220 | 10/1975 | Miller | 29/598 X |
| 3,927,456 | 12/1975 | Dammar | 29/598 X |
| 3,927,469 | 12/1975 | Dammar | 29/598 X |
| 4,052,783 | 10/1977 | Shively | 29/597 |

FOREIGN PATENT DOCUMENTS 1589860 12/1973 Fed. Rep. of Germany ..... 242/7.05 R

*Primary Examiner*—J. Franklin Foss
*Attorney, Agent, or Firm*—William H. McNeill

[57] ABSTRACT

A mechanical winding device for obtaining complex movements comprises a first means for causing movement from one point whose projection on a given axis is a sinusoidal movement with respect to time at a determined frequency. A second means causes the movement of the first means in such a way that the projection of the point of movement along a given axis is the algebraic sum of a sinusoidal movement in respect to time at a determined frequency and of a sinusoidal movement in respect to time at a frequency three times that of the previously determined frequency. Receptor means for the movement is also obtained.

10 Claims, 6 Drawing Figures

WINDING DEVICE

The invention concerns a device which permits one to obtain the complex continuous movement of a given point, movement consisting of the combination of translation movements around an axis of symmetry.

Such a device is useful notably for the manufacture of special shaped windings limited by crooked surfaces which are not smooth.

It is known that by using the Fourier series we can decompose all curves into a sum of sinusoidal and/or cosinusoidal functions, and approximate the curve studied by using only the first harmonics.

Likewise, a complex continuous movement having an axis of symmetry can be decomposed by using either sinusoidal or cosinusoidal functions and approximated by using the first terms of the decomposition.

The present invention consists notably in the use of the first harmonics of such a decomposition in order to determine, with the aid of simple sinusoidal movements, obtained mechanically, a continuous complex movement having an axis of symmetry.

According to the present invention we find, on the one hand, that the sinusoidal movements are added to obtain certain sought for movements, while on the other hand, the movements thus obtained are added in view of determining the necessary complex continuous movement, for example, the introduction of a wire into a slot of a drill jig in order to obtain crooked windings whose shape is not smooth.

According to the actualization method of the present invention, a mechanism can be used which engenders the sinusoidal movements required and combines them, using a mechanism including three elements; the first, located on the first plane, supplies the movements needed for rotation, the second, located on a perpendicular plane to the first, supplies the translation movements required and the third combines the movements obtained.

The first two elements of the device are formed identically by a plurality of gears each cooperating with one another, placed on a rigid mounted support oscillating around the gear axis slaved to a motor and causing a continuous rotating movement. Each of the outer gears is connected to the end of a rod, the other end of each of the aforesaid rods being respectively connected to the fixed jig of the device and to the receptor means of movement. It is thus possible to transform the movement obtained, either into translation movements, or into rotation movements, by a play of rods.

The third element, combining the translation and rotation movements, consists mainly of a partly splined shaft with, on the one hand, a gear whose center is splined complimentarily so as to mesh with the aforesaid shaft in rotation, and on the other hand, by a bushing which frees the shaft in rotation but drives it in translation.

The invention can be better understood, and the other purposes, characteristics, advantages of it will appear more clearly by reading the description which follows and referring to the drawings in the annex; description and drawings being given merely as an indication (not limitative), in order to illustrate the manner of applying this invention.

FIG. 3 represents schematically in space the complex continuous movement sought for.

Figure 1:
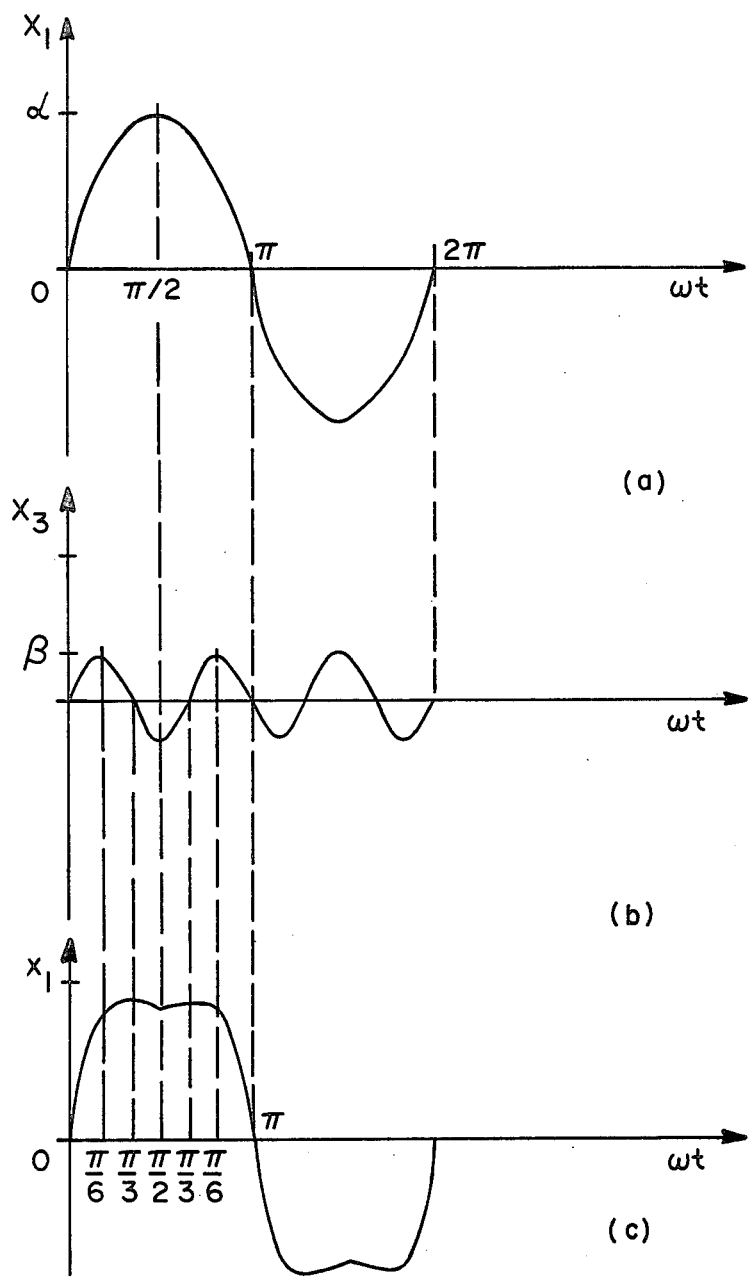
FIG. 1 illustrates the principle of utilization of the first harmonics to determine a complex movement.

In FIG. 1, the curved line $X_1 = \alpha \sin \omega t$ is represented in a; the curve $X_3 = \beta \sin 3\omega t$, in b, $\omega$ being the pulsation of $X_1$, defined by the frequency $f = \omega/2\pi$.

The algebraic sum point by point of these two curves permits us to determine the curve c: $X_1 + X_3 = \alpha \sin \omega t + \beta \sin 3\omega t$.

This last curve constitutes already a good approximation of a series of trapezoidal crenates and it is possible to still obtain a better approximation by adding the curve obtained point by point, with the curve $X_5 = \gamma \sin 5\omega t$, in a way such as to increase the side slope of the trapezoidal crenate and to decrease the slight oscillation which we can see appear in c between $t = \pi/6\omega$ and $t = 5\pi/6\omega$.

By making the mechanical analogy of such an approximation, it is possible to say that we have represented the projection, on an axis $X_1$, of the movement of one point located on the spoke of a wheel making a complete rotation in a time $t = 2\pi/\omega$, in respect to the time.

If the projection of the axis of this wheel itself carries out the sinusoidal movement function of the time represented in b, with a frequency three times that of the first movement, the projection on the axis Ox of the movement of the first point previously considered, located on a spoke of this wheel, is represented by the curve c in respect to the time, and is made up of the algebraic sum of the two movements cited.

The projection on the Ox axis of the point considered causes. practically at each cycle, a movement in a determined direction after a period of stoppage, then a new movement in the opposite direction after a new stoppage period.

It is now possible to describe a preferred form for achievement of the invention.

Figure 2:
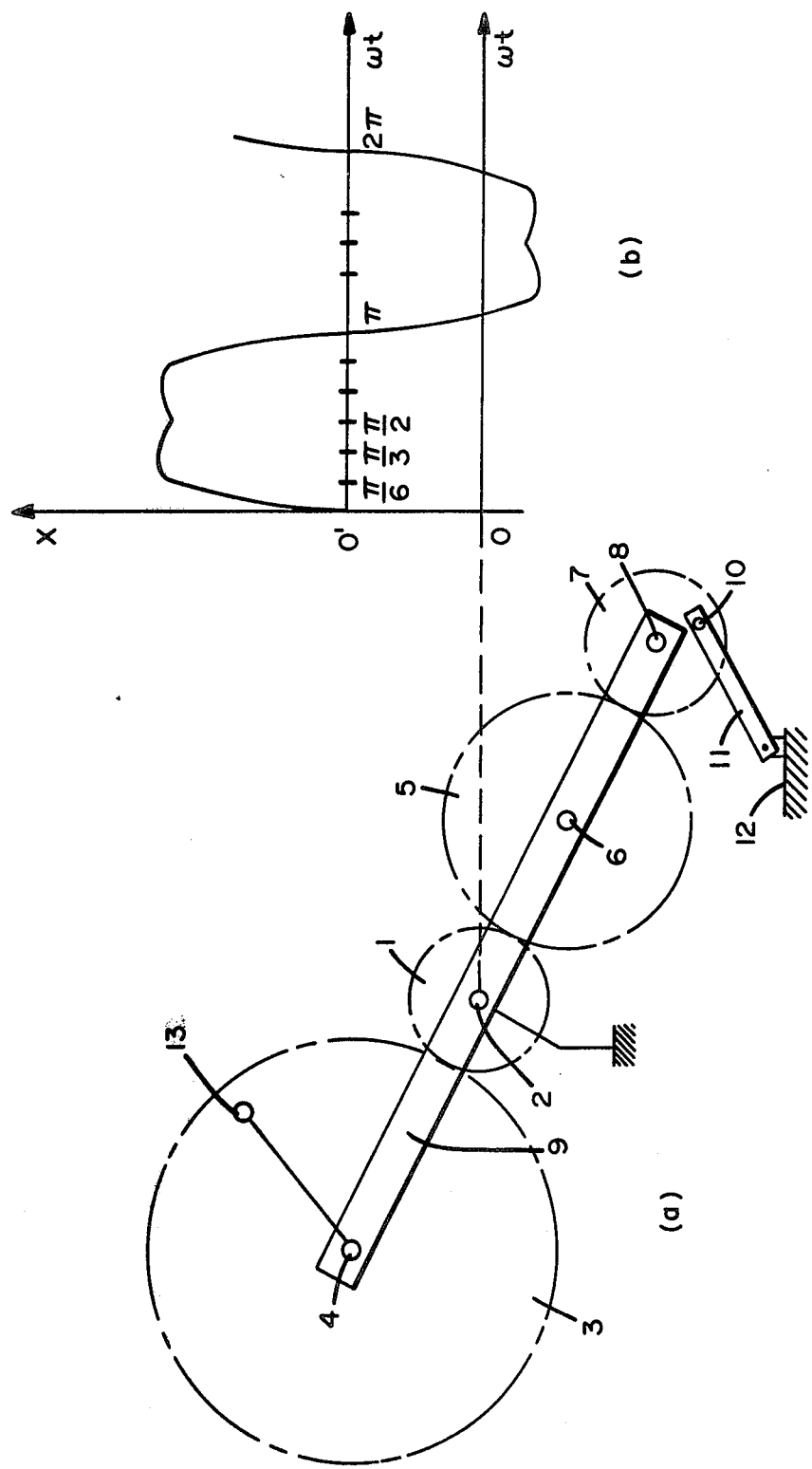
FIG. 2 represents a plurality of gears cooperating with each other in conformance with the invention.

FIG. 2a represents a device which permits mechanical meshing of the movement of a point located on the spoke of a wheel, movement whose projection on an Ox axis (FIG. 2b) corresponds to the curve represented in FIG. 1c.

According to this form of achievement, the device consists of a plurality of gears in this example by a train of meshing rotary means all arranged along the same plane. It is understood of course, that to these meshing means, consisting of gears and cogged wheels, there also can be substituted partially or fully friction driving means such as pulleys and belts.

In the FIG. 2a, a first gear 1, with fixed pin 2, is the motor gear connected to the continuous rotation drive motor, not represented in the figure. This gear 1 meshed on the one hand with cogged wheel 3 whose pin 4 is mobile, and on the other hand with cogged wheel 5, equally with mobile pin 6. Cogged wheel 5 meshed itself with gear 7 to moving pin 8. The pins 2, 4, 6 and 8 are supported by arm 9, moving around pin 2 of gear 1. Under these conditions, whatever the position of moving arm 9 might be, the relative position of the gears and wheels is not modified.

Gear 7 is connected to one of the ends 10 of rod 11 whose other end 12 is connected to the device jig.

From what has been said above, it is quite evident that in this case the gears 1 and 7 have the same diameter while cogged wheel 3 has a diameter 3 times that of gear 1. The diameter of cogged wheel 5 is indifferent, this wheel intervening only to ensure the transmission of movement. Thus, when gear 1 makes three complete turns, gear 7 also makes three turns while cogged wheel 3 makes only one turn.

The fact that rod 11 has a fixed end 12 and an end 10 integral with a point found on spoke of gear 7, the aforesaid point is at a fixed constant distance from point 12 when this gear is in rotation. Consequently, pin 8 of gear 7, which is required to remain at a given distance from pin 2 of gear 1, is mobile along an arc of a circle whose center is precisely pin 2 of gear 1. This arc is described in one direction than another at each turn of gear 7. This movement is transmitted to pin 4 of cogged wheel 3 by means of the moving arm 9 around pin 2. Thus, when cogged wheel 3 makes one full turn, its pin 4 has made an arc of the circle 3 times in each direction.

If reference 13 designates a given point on a spoke of wheel 3, we can represent the movement of the projection of this point 13 on an axis OX in respect to time, by the line drawn and represented in FIG. 2b. This movement is the sum of the rotation movement of wheel 3 around its axis 4 at a given frequency and of a movement made by pin 4 along the arc of the center circle 2 at three times the frequency of cogged wheel 3.

Of course, gear 5 can be replaced by a belt or any other means of transmission.

The projection movement of point 13 is thus of the type: $X = \alpha \sin \omega t + \beta \sin 3\omega t$, where $\omega$ is a function of the rotation speed of gear-motor 1 and $\alpha$ and $\beta$ function of the distance of point 13 of pin 4, of the length of the moving arm 9, the length of rod 11 and the distance of point 10 to pin 8.

In order to realize a continuous complex movement, it is sufficient to combine several mechanisms such as those described above.

Figure 3:
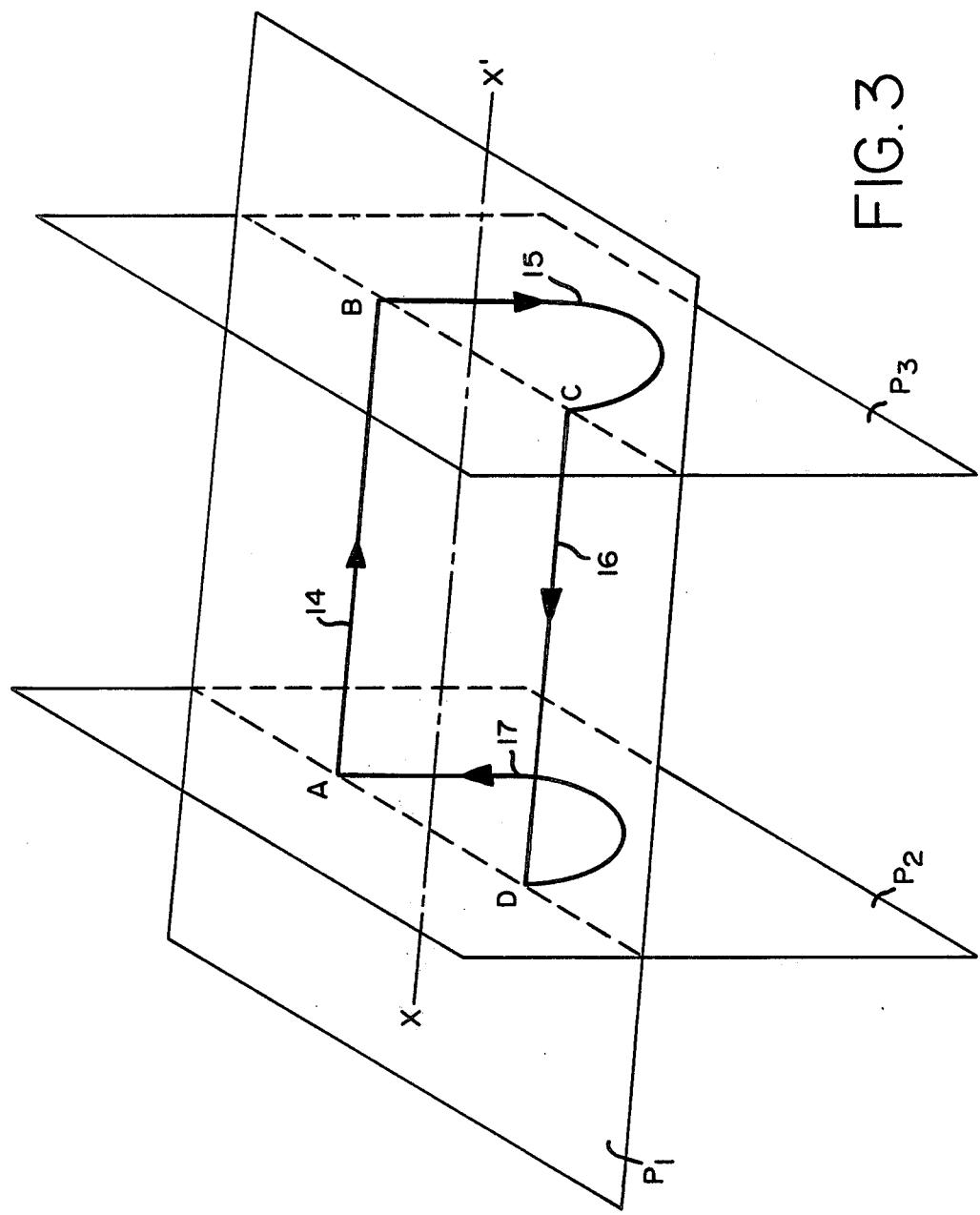

As an example, in FIG. 3 of the diagram is shown the form of a continuous complex movement having an axis of symmetry XX', necessary to insert a wire in a slot of a jig destined to manufacture windings of the classical smoothless type.

This continuous complex movement is carried out along three distinct planes. A first horizontal plane $P_1$ with the axis of symmetry XX' of the movement; it is along the first plane that the translation movements of the device are to be situated.

Two other planes $P_2$ and $P_3$, are the parallel vertical planes between them, perpendicular to the first plane $P_1$ and are located at the ends of the translation vectors of the device; it is along these planes that the two movements of rotation of the device are situated.

The continuous complex movement can thus be divided into four successive phases.

during a first period, the movement is a first movement of translation 14 of vector $\vec{AB}$ for amplitude and a given direction, along the horizontal plane $P_1$; there is no rotation movement during this phase;

during a second period, the translation movement is interrupted, and the movement is a rotation movement 15 whose axis is the axis of symmetry XX' of the full movement, of a half-circle in the first direction, along plane $P_3$, perpendicular to plane $P_1$, during a third period, the rotation movement is interrupted and the movement is a translation movement 16 of a vector $\vec{CD}$ with an amplitude equal to the vector $\vec{AB}$, but in the opposite direction, along the horizontal plane $P_1$, finally, during a fourth period, the translation movement is interrupted, and the movement is a rotation movement 17 along the plane $P_2$ perpendicular to the horizontal plane $P_1$, of a half-circle, in the opposite direction to that of the first rotation movement situated along plane $P_3$ and the axis is the axis of symmetry XX' of the full movement.

In summarizing, the moving point must make a first translation AB, then a first rotation BC, a second translation CD, and finally a second rotation DA.

In order to obtain this complex continuous movement, the device includes three elements:

The first, located along the first plane, supplies the movements required for rotation; the second, located along a perpendicular plane to the first, supplies the translation movement required and the third combines the two movements obtained. The first two elements consist of an identical mechanism described previously; a rod integral with cogged wheel 3 permits one to transform the movement of point 13 of FIG. 2, either into a rotary movement, or into a translation movement.

Figure 4:
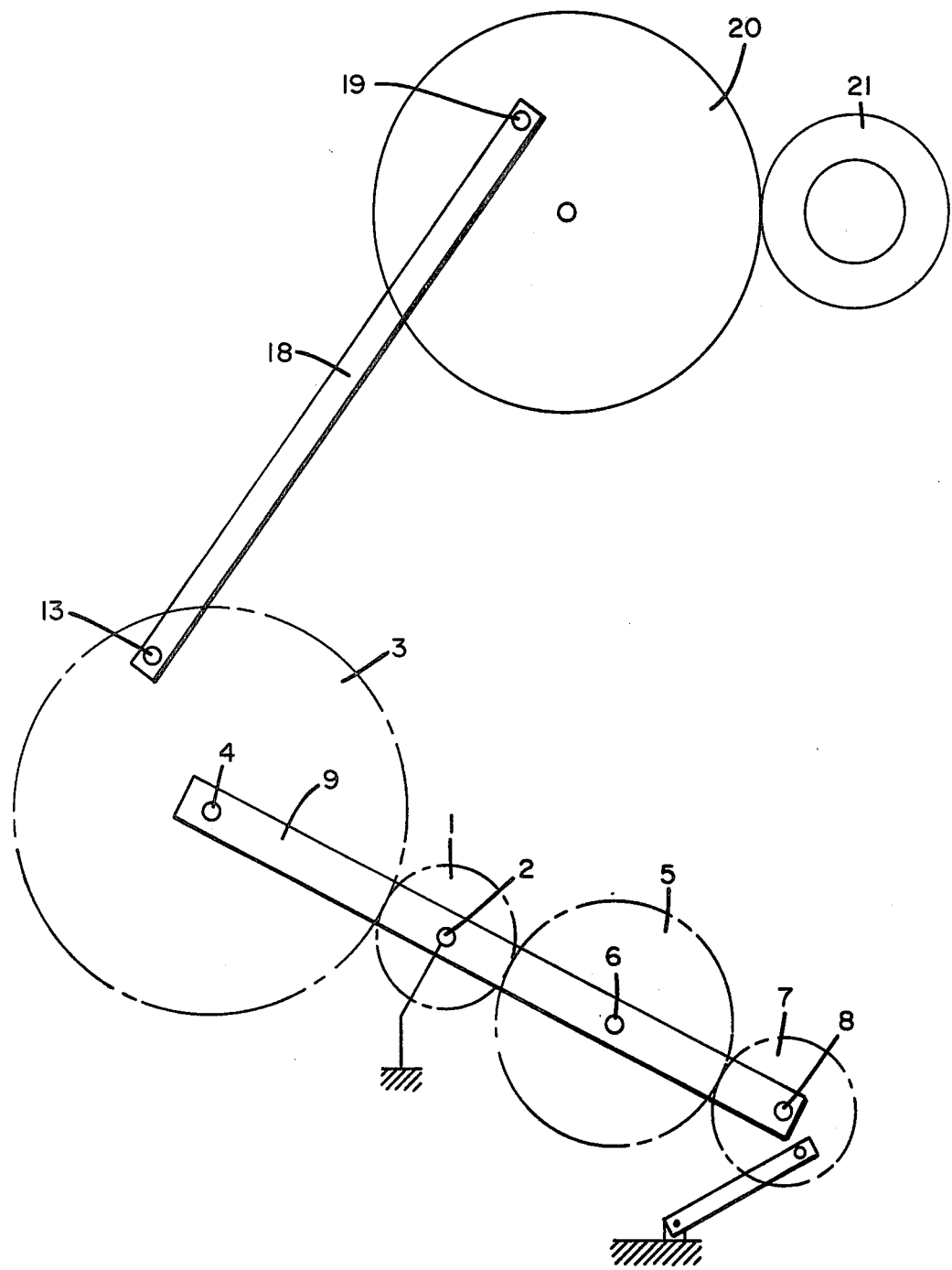
FIG. 4 represents the first element of the device which permits one to obtain the rotation movement.

As can be seen in FIG. 4, representing the transformation movement obtained in required rotation movements, rod 18 is integral with one of these ends of point 13 of cogged wheel 3 and to the other end, of point 19 located on a spoke of cogged wheel 20 meshed with an extension gear 21. Cogged wheel 20 and gear 21 are installed on pins integral with the device jig.

Rod 18 is arranged in a way such that the extension gear first makes a half turn in one determined direction, followed by a stop, then a half turn in the opposite direction, also followed by a stop.

Figure 5:
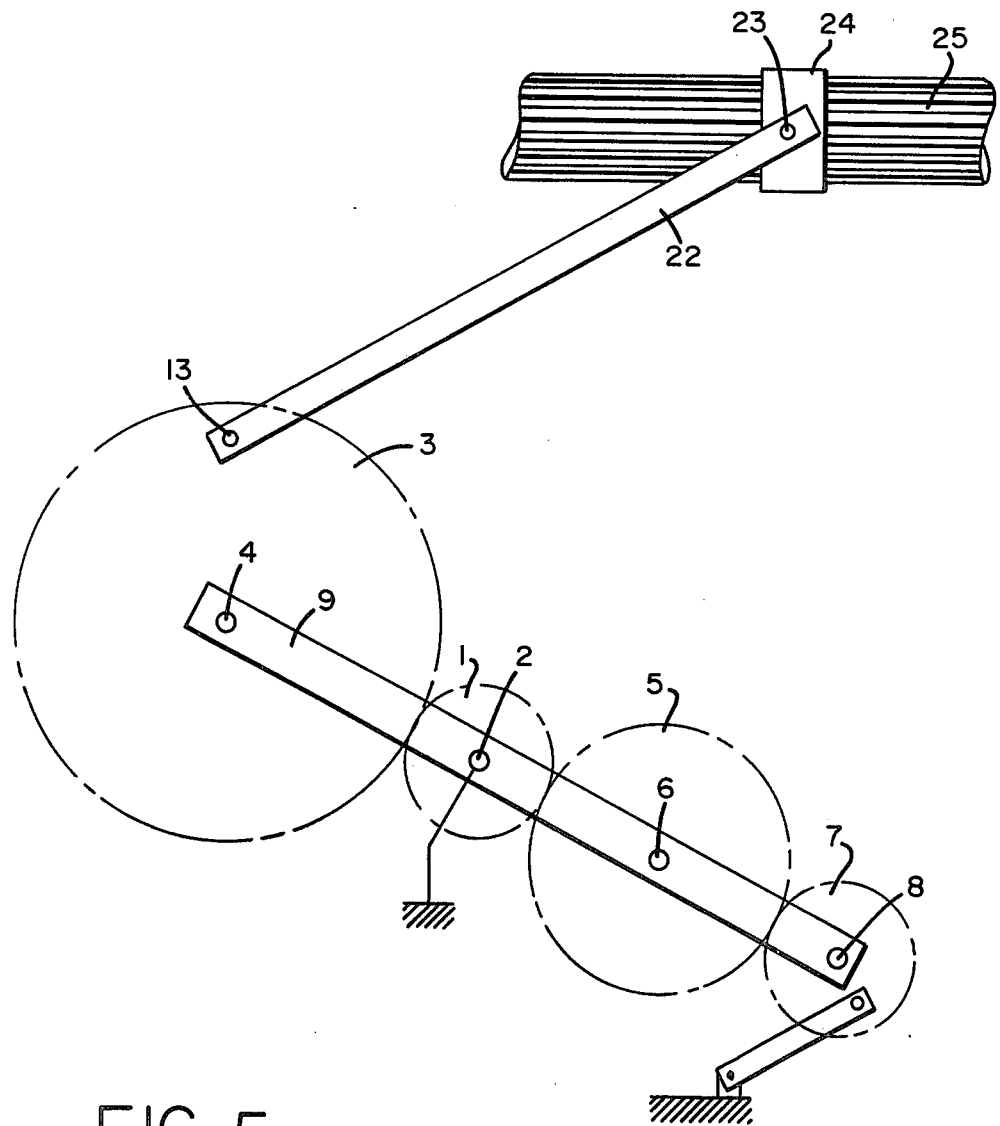
FIG. 5 represents the second element of the device which permits one to obtain the translation movement.

Just as can be seen in FIG. 5 representing the transformation of movement obtained in oscillating movements and cut off from time to time by stops, one of the ends of rod 22 is connected to point 13 of the cogged wheel 3, the other end 23 being connected to an element 24 sliding on shaft 25. A so called trapeze device can also be used to transform this movement.

Third element combines the movements obtained through the first two elements.

By placing the second element of the device meshing the translation movements in a vertical plane parallel to the translation vectors and the first element in a vertical plane perpendicular to the plane of the second element, the two motorgears 1 can be driven by a single motor, by means, for example, of conical meshing conveniently arranged so that the movements achieved by each of the elements are successive, that is, during a first period, rotation of a half turn of gear 21 in a given direction followed by a translation of vector V, of sliding element 24, itself followed by a half turn rotation in the opposite direction, of gear 21; then finally a translation movement of vector-V, of the sliding element 24; and so on.

Figure 6:
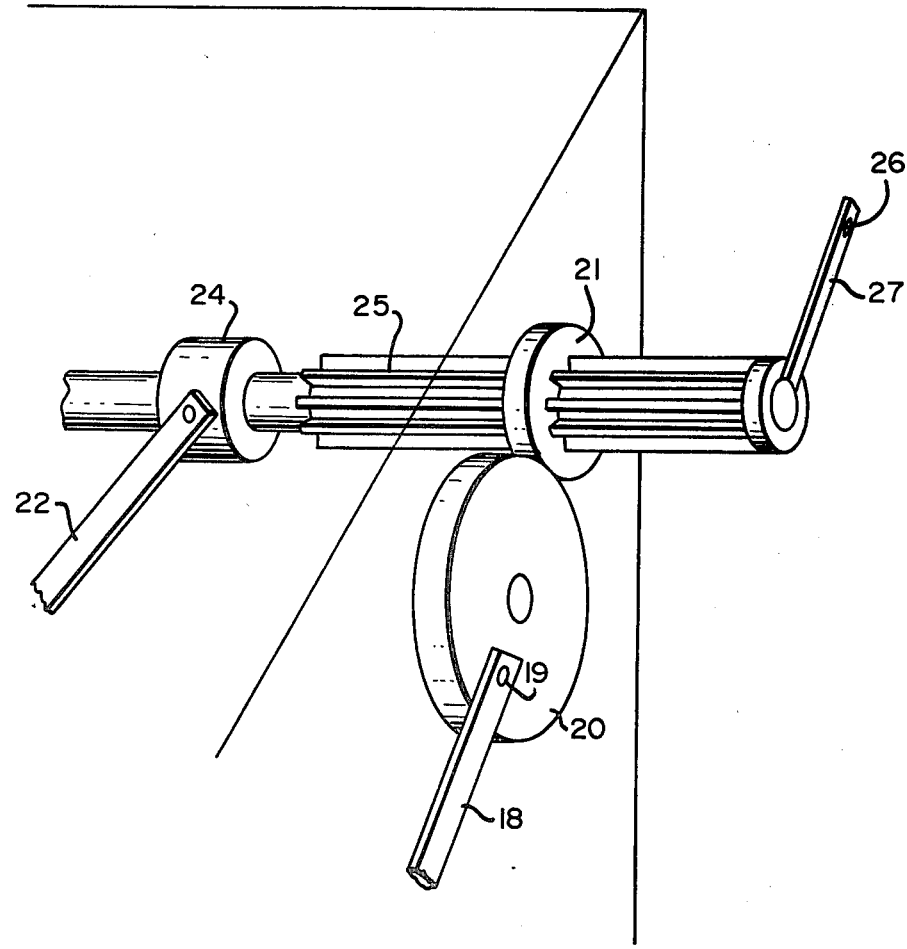
FIG. 6 represents the third element of the device combining the movements of rotation and translation.

In FIG. 6, where the references of parts described previously have been kept, rod 22 is integral with the bushing 24 installed free in rotation on shaft 25 but by means such as the stops permitting one to determine the longitudinal movements of shaft 24. On the other hand, gear 21 meshed with wheel 20 on which rod 18 is connected to point 19 is splined at its center and arranged on shaft 25 complimentarily splined. At the end of the shaft 24 is placed whip 27.

In part, rod 22 is controlled, on the one hand, by the mechanism shown in FIG. 5, and on the other hand, the wheel 20 is controlled by a mechanism shown in FIG. 4.

Thus, the rotation movements in one direction can transmit in the other direction to shaft 25 by means of the assembly 18, 19, 20 and 21, and the longitudinal movements controlled by the assembly 22–24 to this shaft are found to be well joined at the end 26 of whip 27 and carry out quite well the complex movements required, such as successively:

a translation movement in one direction,
a rotation movement in one direction,
a translation movement in the opposite diection from the first,
a rotation movement in the opposite direction from the first, and so on.

It is understood that all variations brought to the elements which constitute the device whose means of achievement have been given as an example, are not to extend beyond the framework of the invention.

What is claimed is:

1. Mechanical device for obtaining complex movements, characterized in that it consists of:
    a first means of causing the movement from one point whose projection on a given axis is a sinusoidal movement in respect to time at a determined frequency.
    a second means causing the movement of the first means in a way such that the projection of the point of movement considered along a given axis is the algebraic sum of a sinusoidal movement in respect to time at a determined frequency and of a sinusoidal movement in respect to time at a frequency three times that of the previous determined frequency,
    and the receptor means of the movement obtained.

2. Device following claim 1, characterized in that it includes the combination of:
    a first gear with fixed pins cooperating, on the one hand, with a second gear with a moving pin and, on the other hand, a third gear with moving pin, the aforesaid gears being aligned,
    a rigid mounted support oscillating around the pin of the first gear, integral with the pins of the aforesaid gears,
    a rod one of whose ends is integral with a point of a spoke of the third gear and the other end being integral with the device jig,
    a means of transmission between the first and third gears
    means of movement reception.

3. Device following claim 2, characterized in that the means of transmission is a fourth gear cooperating with the first and third gears.

4. Device following claim 2, characterized in that the means of transmission is a belt driving the first and third gears.

5. Device following claim 2, characterized in that the first gear is a motor gear.

6. Device following claim 2 or claim 5, characterized in that the diameter of the first gear is equal to that of the third gear and is three times smaller than the diameter of the second gear.

7. Device following claim 2, characterized in that the gears forming a meshing train, each of the two means of outer meshing of the aforesaid train being connected to the end of the rod, the other end of each of the aforesaid rods being respectively connected to the fixed jig of the device and to the receptor means of movement, giving thus to the aforesaid receptor means successive movements in one or the other directions.

8. Device following claims 2 or 7, characterized in that the receptor means of movement are such that the gear and cogged wheels to which the successive rotation movements are given in one direction or the other by means of a rod.

9. Device following claims 2 or 7, characterized in that the reception means of movement are such that a shaft in rectilinear movement successively in one direction and then the other under the affect of its connection to the corresponding rod to which it is connected.

10. Device following any one of the claims 2, 7, 8, and 9, characterized in that they include two gear trains arranged perpendicular to act together on a whip guide-wire integral with splined shaft on which are installed, on the one hand, a gear whose center hole is splined complementarily, on the other hand, by bushing which is integral with the aforesaid longitudinal shaft but free in rotation, one of the two aforesaid trains acts on the aforesaid splined gear, the other on the aforesaid longitudinal bushing, in a way such that the splined shaft and guide-wire which is integral with it successively carries out the required movements; a first translation movement, a first rotation movement of a half-circle in one direction, a second translation movement in the opposite direction from the direction of the aforesaid first movement, a second rotation movement of a half-circle in the opposite direction from the aforesaid first rotation movement, the motor-gears of each of the trains being simultaneously driven in a way such as to obtain the required successive movements.

* * * * *